United States Patent
Grob-Lipski et al.

(10) Patent No.: US 10,178,652 B2
(45) Date of Patent: Jan. 8, 2019

(54) METHOD FOR OPERATING A NETWORK ELEMENT OF A WIRELESS COMMUNICATION NETWORK AND NETWORK ELEMENT

(71) Applicant: Alcatel Lucent, Boulogne Billancourt (FR)

(72) Inventors: Heidrun Grob-Lipski, Stuttgart (DE); Fariborz Derakhshan, Stuttgart (DE); Bernd Haberland, Stuttgart (DE)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 14/402,990

(22) PCT Filed: Mar. 22, 2013

(86) PCT No.: PCT/EP2013/056124
§ 371 (c)(1),
(2) Date: Nov. 21, 2014

(87) PCT Pub. No.: WO2013/174544
PCT Pub. Date: Nov. 28, 2013

(65) Prior Publication Data
US 2015/0139100 A1    May 21, 2015

(30) Foreign Application Priority Data
May 25, 2012   (EP) ...................................... 12305584

(51) Int. Cl.
*H04W 4/00* (2018.01)
*H04W 72/04* (2009.01)
(Continued)

(52) U.S. Cl.
CPC ........... *H04W 72/04* (2013.01); *H04W 16/02* (2013.01); *H04W 88/085* (2013.01); *H04W 28/16* (2013.01)

(58) Field of Classification Search
None
See application file for complete search history.

(56) References Cited

U.S. PATENT DOCUMENTS

| 7,937,110 B2 | 5/2011 | Wu et al. |
| 8,224,386 B2 | 7/2012 | Oyane et al. |

(Continued)

FOREIGN PATENT DOCUMENTS

| CN | 1753332 A | 3/2006 |
| CN | 101132648 A | 2/2008 |

(Continued)

OTHER PUBLICATIONS

Alcatel-Lucent, "LightRadio Portfolio: White Paper," Technical Review, Technology White Paper #1, 16 pages, XP002687733, 2011.

(Continued)

*Primary Examiner* — Jutai Kao
(74) *Attorney, Agent, or Firm* — Fay Sharpe LLP

(57) ABSTRACT

The invention refers to a method (33) for operating a wireless communication network (11) or a network element (13) thereof, the network (11) comprising a plurality of baseband processing devices (13). In order to allow for performing baseband processing tasks by multiple cooperating baseband processing devices (13) such that the real time constraints are met, it is proposed that the method (33) comprise determining (39) a delay metric (RTT_BBU) that depends on a network delay between the network element (13) and at least one baseband processing device (13) of the plurality of baseband processing devices (13), wherein the (Continued)

delay metric (RTT_BBU) is determined before an event (e) occurs that triggers allocation or reallocation of processing resources of the at least one baseband processing device (13), and selecting (55, 65) the at least one baseband processing device of the plurality of baseband processing devices for remote processing depending on the delay metric (RTT_BBU).

16 Claims, 4 Drawing Sheets

(51) Int. Cl.
*H04W 16/02* (2009.01)
*H04W 88/08* (2009.01)
*H04W 28/16* (2009.01)

(56) References Cited

U.S. PATENT DOCUMENTS

| | | | |
|---|---|---|---|
| 8,467,818 B2 | 6/2013 | Liu et al. | |
| 8,689,073 B2 | 4/2014 | Cai et al. | |
| 8,958,844 B2 | 2/2015 | Chisaka | |
| 2005/0215269 A1* | 9/2005 | Cheok | G01S 5/0284 455/456.1 |
| 2008/0318589 A1* | 12/2008 | Liu | H04W 88/08 455/453 |
| 2011/0268446 A1 | 11/2011 | Cune et al. | |
| 2012/0071201 A1* | 3/2012 | Chisaka | H04W 36/0055 455/525 |
| 2012/0230282 A1 | 9/2012 | Wu et al. | |
| 2015/0131629 A1* | 5/2015 | Wu | H04L 5/0037 370/336 |

FOREIGN PATENT DOCUMENTS

| | | |
|---|---|---|
| CN | 102084679 A | 6/2011 |
| CN | 102113266 A | 6/2011 |
| JP | 2007-529926 A | 10/2007 |
| JP | 2011-010254 A | 1/2011 |
| WO | WO 2010/017222 A1 | 2/2010 |
| WO | WO 2011/063740 A1 | 6/2011 |
| WO | WO 2011/127855 A2 | 10/2011 |

OTHER PUBLICATIONS

Nokia Siemens Networks, "Liquid Radio Let traffic waves flow most efficiently," 12 pages, XP002687734, 2011.
Chttl et al., "Views on heterogeneous deployment scenarios with distributed RRHs," 3$^{rd}$ Generation Partnership Project (3GPP), 3GPP TSG RAN WG1 Meeting #64, R1-111006, pp. 1-3, XP050490799, Taipei, Taiwan, Feb. 21-25, 2011.
Hu Jinling, "TD-SCDMA/TD-LTE Evolution-Go Green," Communication Systems, IEEE, pp. 301-305, 2010.
International Search Report for PCT/EP2013/056124 dated May 8, 2013.

* cited by examiner

METHOD FOR OPERATING A NETWORK ELEMENT OF A WIRELESS COMMUNICATION NETWORK AND NETWORK ELEMENT

DESCRIPTION

FIELD OF THE INVENTION

The present invention refers to a method for operating a wireless communication network or a network element of the wireless communication network, the network comprising a plurality of baseband processing devices. In addition, the invention refers to such a network element, such a communication network and a computer program product that is programmed for executing the method for operating the network element.

BACKGROUND

It is known in the art to subdivide a base station for a wireless communication network, such as a cellular radio access network, into a baseband processing device and at least one radio head connected to the baseband processing device. Typically, the base station comprises a cluster of multiple radio heads connected to the baseband processing device. Usually, optical links are used in order to connect the remote radio heads to the baseband processing device. An interface used for the communication between the baseband processing device and the radio head has been specified (Common Public Radio Interface, CPRI).

This base station architecture including baseband processing devices and remote radio head has recently been extended by introducing mechanisms for distributing baseband processing tasks among a plurality of baseband processing devices. This mechanism allows to build a pool of baseband processing devices that performs baseband processing tasks for a comparatively high number of remote radio heads. Pooling of baseband processing device allows for increasing the utilisation of the baseband processing devices and therefore reducing the total number of baseband processing devices needed to process a certain amount of communication traffic handled by a radio access network. In addition, the deployment of the baseband processing devices can be centralised. As a consequence, installation and operation of a radio access network with a pool of baseband processing devices is more cost efficient than a radio access network that has a fixed assignment of baseband processing tasks to the individual baseband processing devices.

SUMMARY

In a pool of baseband processing devices, multiple baseband processing devices may cooperate with each other to carry out a certain baseband processing task. This cooperation introduces additional delays for communication between the cooperating baseband processing devices. However, the baseband processing tasks must comply with real time constraints originating from quality of service requirements or timing constraints in signalling procedures used in the radio access network.

Thus, the object of the present invention is to provide a method for operating a wireless communication network or a network element thereof and to provide such a network element that allows for performing baseband processing tasks by multiple cooperating baseband processing devices of a pool comprising a plurality of baseband processing devices such that the real time constraints are met.

According to an embodiment, a method for operating a wireless communication network or for operating a network element of the network is provided, the network comprising a plurality of baseband processing devices, the method comprising determining a delay metric that depends on a network delay between the network element and at least one baseband processing device of the plurality of baseband processing devices and selecting the at least one baseband processing device of the plurality of baseband processing devices for remote processing, said selecting depending on the delay metric. By determining the delay metric for the at least one baseband processing device and selecting the baseband processing device depending on the delay metric, only those baseband processing devices are considered for remote processing, the network delay between the network element and the respective baseband processing device is sufficiently low so that real time constraints can be met when the remote baseband processing device performs remote processing for the network element.

In an embodiment, the delay metric depends on a round trip time between the network element and the at least one baseband processing device of the plurality of baseband processing devices. The round trip time may be measured using any suitable protocol that allows for receiving an immediate response from a remote node (e.g. the baseband processing device) after having sent a request to the remote node. For instance, echo request and echo response messages, e.g. on the layer 2 (e.g. Ethernet) or on the network layer (e.g. Internet Protocol, IP) may be applied.

Preferably, the delay metric may be determined—e.g. during an initialization phase of the network element—before an event occurs that triggers allocation or reallocation of processing resources of the at least one baseband processing device. Said event may occur e.g. when a radio bearer is set up in the network, when the radio bearer is modified or torn down or when a handover of a mobile terminal is performed in the network.

In an embodiment, said selecting includes comparing the delay metric determined before the occurrence of the event with a first delay threshold and selecting at least one baseband processing device as a candidate baseband processing device depending on said comparing. Preferably, the baseband processing device is selected as a candidate baseband processing device if the delay metric is less than the first delay threshold. Both the delay metric and the first delay threshold may be related to a one-way delay or a round trip time.

For the sake of an efficient implementation of the method, in an embodiment, the method comprises generating a candidate list that includes the baseband processing devices selected as candidate baseband processing devices.

Furthermore, in an embodiment, the delay metric may be determined upon the occurrence of the event that triggers allocation or reallocation of baseband processing resources, the delay metric being preferably determined for at least one candidate baseband processing device. The delay metric may not only be determined before the occurrence of the event, e.g. in the initialisation phase, but also when the event that may lead to the allocation or reallocation of processing resources occurs. By determining the delay metric again when the events occurs, the reliability of the method is improved because the delay metric calculated upon occurrence of the event reflects the current state of an interconnection network that interconnects the network element and the plurality of baseband processing devices. Preferably, the delay metric is determined again upon the occurrence of the event for each candidate baseband processing device. By determining the delay metric only for the candidate baseband processing devices and not for all baseband processing device reachable by the network element, the method works efficiently and avoids unnecessary measurements of the delay metric.

In an embodiment, said selecting includes comparing the delay metric determined upon occurrence of the event with a second delay threshold and selecting a candidate baseband processing device as a neighbour baseband processing device for remote processing depending on said comparing. A neighbour baseband processing device is a baseband processing device that is suitable to be used for remote processing as regards the above mentioned real time constraints. The second delay threshold may be related to a one-way delay or a round trip time.

Preferably, the method may comprise generating a neighbour list that includes the at least one baseband processing device selected as a neighbour baseband processing device.

In an embodiment, the method comprises determining a further delay metric that depends on a network delay between the network element and at least one remote radio head of the network and determining the first delay threshold and/or the second delay threshold depending on the further delay metric. A remote radio head includes radio frequency circuitry for transmitting a radio signal to a mobile terminal and receiving the radio signal from the radio terminal. However, the remote radio head does not include the complete signal processing circuitry, in particular baseband signalling processing circuitry, needed for radio transmissions between the network and the terminal. The remote radio head may be connected to the network element by means of a communication arrangement that may include e.g. an optical link. Thus, the further delay metric may reflect a network delay caused by the communication arrangement, in particular by the optical link. For the part of the signal processing that is not performed on the remote radio head, processing resources of the baseband processing devices are allocated. In an embodiment, the further delay metric may be a network round trip time between the network element and the remote radio head.

According to another embodiment, a network element of a wireless communication network comprising a plurality of baseband processing devices is provided, the network element being arranged for determining a delay metric that depends on a network delay between the network element and at least one baseband processing device of the plurality of baseband processing devices and selecting the at least one baseband processing device of the plurality of baseband processing devices for remote processing, said selecting depending on the delay metric.

In an embodiment, the network element is operable, preferably programmed, for executing a method according to the invention, embodiments of which method are herein described.

In an embodiment, the network element is a baseband processing device for a wireless communication network arranged for transmitting a baseband signal to a remote radio head and/or for receiving a baseband signal from the remote radio head.

According to another embodiment, a wireless communication network comprising a network element and a plurality of baseband processing devices is provided, wherein the network and/or a network element of the network is operable for determining a delay metric that depends on a network delay between the network element and at least one baseband processing device of the plurality of baseband processing devices and selecting the at least one baseband processing device of the plurality of baseband processing devices for remote processing, said selecting depending on the delay metric. In an embodiment, the network and/or the network element is arranged for executing a method according to the invention, embodiments of which are described herein.

According to yet another embodiment, a wireless communication network comprising a network element and a plurality of baseband processing devices is provided, wherein the network element is a network element according to the invention. Embodiments of network elements according to the invention are herein described.

According to still another embodiment, a computer program product, preferably a computer readable storage medium, programmed for operating a network element of a wireless communication network comprising a plurality of baseband processing devices when executed on a processor of said network element, the computer program product being programmed for determining a delay metric that depends on a network delay between the network element and at least one baseband processing device of the plurality of baseband processing devices and selecting the at least one baseband processing device of the plurality of baseband processing devices for remote processing, said selecting depending on the delay metric. The computer program product may include any type of computer storage media such as semiconductor memory or magnetic or optical mass storage media. In particular the network element may include a storage element on which the computer program for executing a method according to the present invention is stored so that the processor executes that computer program when operating the network element.

In an embodiment, the computer program product is programmed for executing a method according to the invention. Embodiments of the method according to the invention are herein described.

BRIEF DESCRIPTION OF THE FIGURES

Exemplary embodiments and further advantages of the present invention are shown in the Figures and described in detail hereinafter.

DESCRIPTION OF THE EMBODIMENTS

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 1:
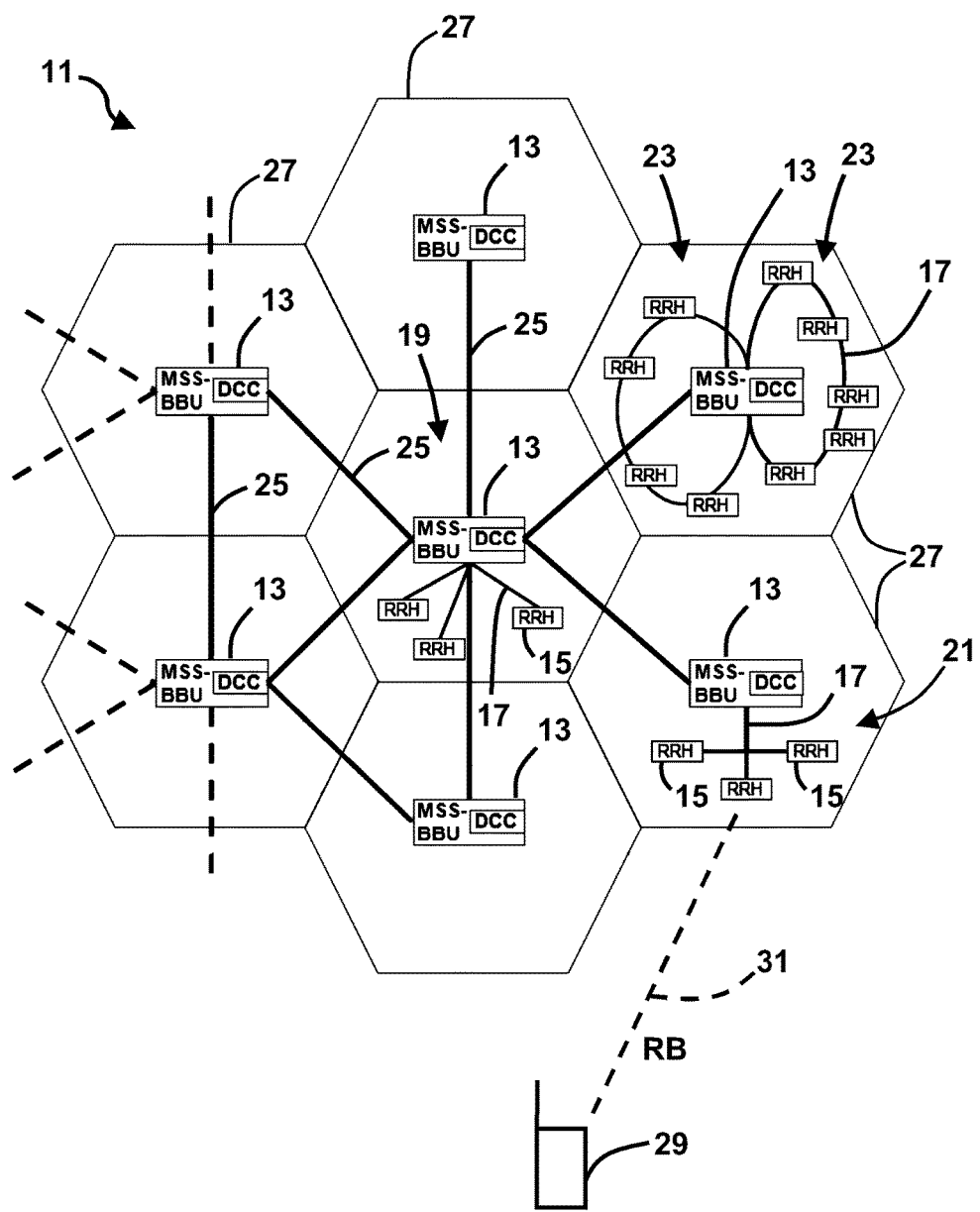
FIG. 1 shows a wireless communication network.

FIG. 1 shows a cellular radio access network 11 comprising a plurality of band processing devices 13 and multiple remote radio heads 15. A single radio head 15 or a cluster of multiple radio heads 15 is allocated to a single baseband processing device 13. The remote radio heads 15 allocated to a certain baseband processing device 13 may be connected to that baseband processing device 13 by means of any suitable communication arrangement. In the shown embodiment, the communication arrangement includes at least one optical link 17. As shown in the middle of FIG. 1, the communication arrangement may comprise multiple point to point links 17 between the remote radio heads 15 and the baseband processing device 13 which results in a tree topology 19 of the communication arrangement. However, in an embodiment, a point to multipoint topology may be applied. For example, the communication arrangement may include a passive optical network (PON 21). Furthermore, the communication arrangement may comprise one or more optical rings 23 connecting multiple remote radio heads 15 to a baseband processing device 13. In the shown example, the baseband processing device 13 on the top right side of FIG. 1 is connected to two optical rings 23. However, it is possible to use a single optical ring 23 or more than two optical rings 23. When using a communication arrangement with optical links 25, the overall capacity of the communication arrangement can be increased by using Wavelength Division Multiplex (WDM). In addition, the availability of the communication arrangement can be improved by using redundant links 17.

The baseband processing devices 13 are interconnected with each other by means of an interconnection network comprising one or more interconnection links 25. Thus, the shown interconnection network comprises point to point links 25 only. However, in other embodiments, an interconnection network of a different topology may be used. For example, the interconnection network may be a ring network.

At least one baseband processing device 13 or dedicated switching nodes (not shown) of the interconnection network 11 may forward data between different links 25 of the interconnection network. In other words, the interconnection network may be a packet switching network and may include at least one baseband processing device 13 that functions as a switching node and/or at least one dedicated switching node (e.g. an Ethernet switch or an Internet Protocol router, etc.). The switching node may have packet buffers for temporarily storing packets received from one link 25 and to be forwarded to another link 25. Temporarily storing the packets in the packet buffer leads to variations in a transport delay of packets transmitted from one baseband processing device 13 via the interconnection network to another baseband processing device 13. In general, the transport delay depends on a momentary load of the interconnection network because a mean occupancy of the packet buffers increases with the momentary load.

A cell 27 of the network 11 is covered by at least one remote radio head 15. A mobile terminal 29, also referred to as User Equipment (UE), registered with a cell 27 may communicate with the network 11 via radio link 31 between a terminal 29 and a remote radio head 15 responsible for that cell 27. In the shown embodiment, the radio access network 11 supports multiple radio standards such as GSM, UMTS and/or LTE. The baseband processing devices 13 may comprise multiple interfaces for connecting the radio access network 11 to different core networks of different standards (not shown). Therefore, such baseband processing devices 13 are also referred to as Multi-Side Multi-Standard Base-Band Units (MSS-BBU). A baseband processing device 13, in particular a MSS-BBU, may comprise at least one baseband processing unit (not shown) comprising processing means, e.g. a processor, operable for baseband processing.

The baseband processing devices 13 cooperate with each other in order to perform baseband processing tasks necessary for transmitting data (e.g. payload data or signalling data) to the mobile terminal 29 or for receiving data from the terminal 29 via the remote radio head 15. The baseband processing may include baseband signal processing, e.g. modulation, coding or the like.

The communication between the baseband processing device 13 and the remote radio heads 15 may be performed according to the Common Public Radio Interface (CPRI) specification. However, the present invention is not limited to CPRI. Different interfaces and/or protocols may be used for the communication between the baseband processing devices 13 and the remote radio heads 15.

When operating the network 11, the terminal 29 may register with the network 11 by communicating with a remote radio head 15 that is reachable by the terminal 29 via the radio link 31. This remote radio head 15 is referred to as serving RRH. That is, the remote radio head 15 that forwards payload data between the network 11 and the terminal 29 is the serving RRH. Thus, the serving RRH mainly depends on the current location of the terminal 29. The baseband processing device 13 which is allocated to the serving RRH is referred to as home baseband processing device 13 of a certain terminal 29.

For data transmission between the terminal 29 and the network 11, a radio bearer RB may be set up. When setting up a radio bearer RB, baseband processing resources required for baseband processing with respect to this radio bearer RB are allocated. In some cases, all baseband processing resources required for handling the radio bearer RB are allocated in the home baseband processing device 13. However, in other cases, e.g. if the home baseband processing device 13 has not sufficient available processing resources for handling the radio bearer, the home baseband processing device of the radio network 11 may decide to use processing resources of a different baseband processing device 13 for baseband processing related to that radio bearer RB. To this end, the home baseband processing device may decide to ask another baseband processing device 13 for remote processing. A baseband processing device 13 that performs remote baseband processing for a certain home baseband processing device 13 is also referred to as remote baseband processing device 13 with respect to that home baseband processing device 13. A home baseband processing device 13 for a certain terminal 29 or remote radio head 13 may also function as a remote baseband processing device 13 for at least one different home baseband processing device 13. Moreover, the network 11 may include one or more baseband processing devices 13 that are not connected to any remote radio head 15. These baseband processing devices 13 are never home baseband processing devices 13 but can function as remote baseband processing devices 13 for at least one home baseband processing device 13.

When performing remote processing, the home baseband processing device 13 generates downlink data by itself (e.g. signalling data) or receives downlink data e.g. from the core network (e.g. payload data), forwards the downlink data to a remote baseband processing device 13 for remote signal processing and then receives the processed downlink data from the remote baseband processing device 13 and forwards the processed downlink data to the serving remote radio head 15. Uplink data transmitted by the terminal 13 is received by the serving remote radio head 15 and forwarded to the home baseband processing device 13. The home baseband processing device 13 transmits the uplink data to the remote baseband processing device 13 for remote uplink processing and receives the processed uplink data from the remote baseband processing device 13. The home baseband processing device 13 may, depending on the type of the uplink data, either consume the processed uplink data (e.g. signalling data) or forward the processed uplink data (e.g. payload data) e.g. to the core network.

At least one baseband processing device 13, preferably all baseband processing devices 13, may include a decentralised cloud controller (DCC) which decides on whether remote baseband processing shall be performed for a certain radio bearer and which baseband processing device 13 different from the home baseband processing device shall be used for the remote baseband processing. To this end, the DCC selects the best suited baseband processing device 13 for remote baseband processing. Because real-time constraints must be complied with during baseband processing in order to meet predefined quality of service requirements and to meet timing limitations of signalling protocols, such as the Hybrid Automatic Repeat Request (HARQ) used on the radio link 31, a transmission delay between the home baseband processing device 13 and the baseband processing device 13 for remote baseband processing on the interconnection network is an important characteristic that may be considered when selecting the baseband processing device 13 used for remote baseband processing. In particular, if that delay is too high then the real-time constraints cannot be met and the respective baseband processing device cannot be used for remote baseband processing.

Figure 2:
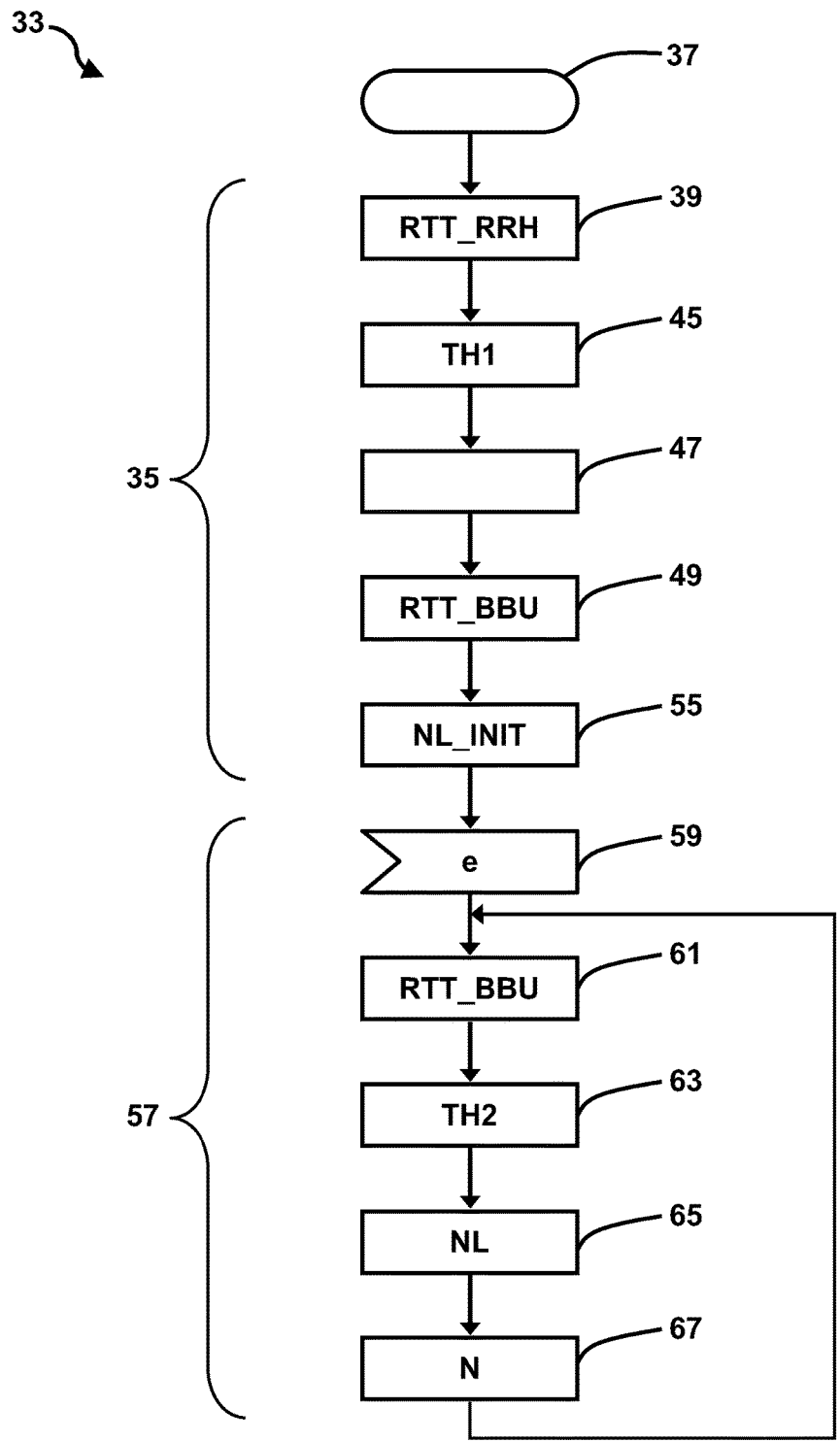
FIG. 2 shows a flowchart of a method for operating a network element such as a baseband processing device of the network shown in FIG. 1.

FIG. 2 shows a flowchart of an exemplary method 33 for selecting at least one baseband processing device 13 for remote baseband processing depending on a delay metric that characterises a delay between the home baseband processing device and the remote baseband processing device 13 used for remote baseband processing. The method 33 may be executed by the home baseband processing device 13, in particular by the DCC of that baseband processing device 13. The baseband processing device 13—in particular its DCC—may comprise a processor and a storage element. A computer program may be stored on the storage element that is executed by the processor when operating the baseband processing device 13. The computer program may be programmed so that the baseband processing device 13 executes the method 33 described herein when running the computer program on the processor.

In an embodiment, the method may be executed by a different network element such as a baseband processing device 13 different than the home baseband processing device 13. In particular, the method may be executed by the DCC of any baseband processing device 13 of the network 11. Moreover, multiple network elements such as multiple baseband processing devices 13 may cooperate with each other in order to execute the method 33 in a distributed way.

As can be seen in FIG. 2, the method 33 has an initialisation phase 35 which is entered after a start 37 of the method 33. The initialisation phase 35 may be executed during a start-up of the network 11, e.g. after powering up at least one baseband processing device 13. The initialisation phase 35 may be executed before an event e occurs in the network 11 that requires an allocation or reallocation of baseband transmission resources to a certain communication process such as a radio bearer.

A step 39 of the initialisation phase 35 is executed after the start 37 of the method 33. In step 39, all delays between at least one baseband processing device 13 and at least one remote radio head 15 to which that baseband processing device 13 is assigned and/or connected is measured. This delay may be a roundtrip time RTT_RRH.

Figure 3:
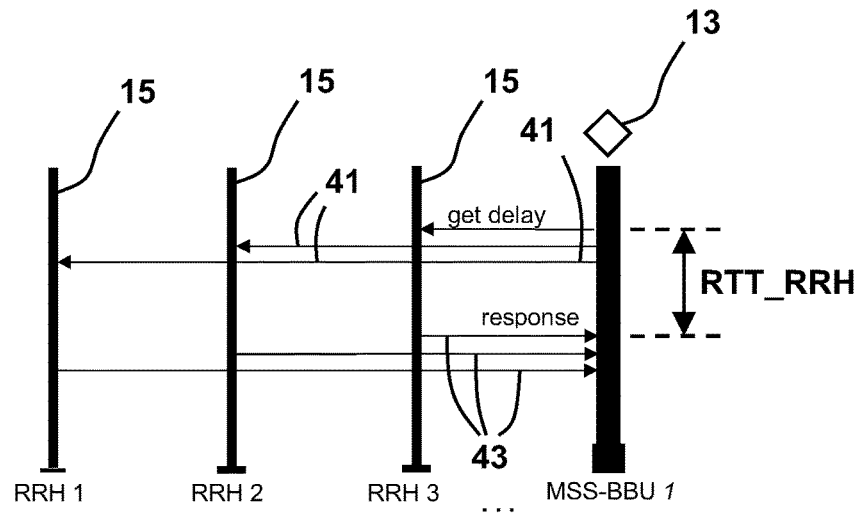
FIG. 3 shows a message sequence chart of test messages for determine a delay between a baseband processing device and remote radio heads of the network shown in FIG. 1.

As shown in FIG. 3, the baseband processing device 13 may measure the roundtrip time RTT_RRH to at least one connected remote radio head 15, preferably to each connected radio head 15, by transmitting a first test message 41 to each remote radio head 15, the roundtrip time to which shall be measured, and receiving a first response message 43 transmitted by the remote radio head 15 in response to the first test message 41. The baseband processing device 13 may determine the roundtrip time RTT_RRH to the remote radio head 15 by subtracting a transmission time of the first test message 41 from a reception time of the respective first response message 43.

A step 45 is executed after step 39 that determines a first delay threshold TH1 for a delay metric that characterises a network delay between the baseband processing device 13 and at least one further baseband processing device 13. This delay metric may be a further roundtrip time RTT_BBU.

The first delay threshold TH1 may be calculated by considering a delay budget according to the following equation:

$$\text{TransportDelay}_{max} = T_{RTT} - \text{ProcessingTime}_{BS} - \text{ProcessingTime}_{UE} - \text{RTT\_AIR} \quad (1)$$

$T_{RTT}$ is a timing requirement related to HARQ. In the Long Term Evolution (LTE) radio system, a complete HARQ process takes eight Transmission Time Intervals (TTI), with each TTI having a duration of 1 ms. During a HARQ process, the network 11 transmits a data packet in a first TTI of that HARQ process. The terminal 29 has four TTIs available for receiving and processing a data packet. In the fifth TTI, the terminal must transmit a positive acknowledgment (ACK) or a negative acknowledgment (NACK). Then the network 11 has one TTI available for receiving the positive or negative acknowledgement and three TTIs for processing the received acknowledgement. In case of a negative acknowledgment, the network 11 must retransmit the data packet in the eighth TTI of the HARQ process. That is, the network 11 has a total delay budget for responding to an acknowledgment of three TTIs, i.e. $T_{RTT}=3$ ms.

ProcessingTime$_{BS}$ and ProcessingTime$_{UE}$ correspond to the signal processing time needed in the base station (i.e. the baseband processing device 13 and the remote radio head 15) and to the signal processing time needed in the terminal 29, respectively. RTT_AIR is the propagation delay on the radio link 31 between the remote radio head 15 and the terminal 29. In an embodiment the overall processing time including the propagation delay RTT_AIR on the radio link 31 is ProcessingTime$_{BS}$+ProcessingTime$_{UE}$+RTT_AIR=2.84325 ms. Thus, in this embodiment related to LTE, the maximum transport delay is TransportDelay$_{max}$=156.75 µs. When considering different real time constraints and/or different mobile communication standards, such as UMTS or GPS, similar calculations of the maximum transport delay TransportDelay$_{max}$ may be performed which may lead to different values of the maximum transport delay $TransportDelay_{max}$.

Furthermore, the following equation for the overall transport delay is valid.

$$TransportDelay_{max} = RTT\_RRH + RTT\_BBU \quad (2)$$

The delay between the baseband processing device 13 to its connected remote radio heads 15 is at least essentially constant. However, the delay between different baseband processing devices 13 has a constant and a dynamic part. The constant part depends on the distance between the baseband processing devices 13. The dynamic part is determined by varying link load conditions on the interconnection links 25 as described above.

In an embodiment, the first delay threshold TH1 may be calculated as follows:

$$TH1 = (TransportDelay_{max} - min(RTT\_RRH))/2 \quad (3)$$

The term min(RTT_RRH) stands for the minimum of all measured round trip time values RTT_RRH between the home baseband processing device 13 and the remote radio heads 15 connected to that home baseband processing device 13. Calculating the first delay threshold TH1 depending on the minimum of the measured round trip times RTT_BBU has the effect that a rather high number of potential remote baseband processing devices 13 are selected during the initialisation phase 35.

Step 45 is followed by a step 47 that discovers all reachable baseband processing devices 13. Then a step 49 is executed that determines the delay metric, e.g. the roundtrip time RRT_BBU to the baseband processing devices 13 discovered in step 47.

Figure 4:
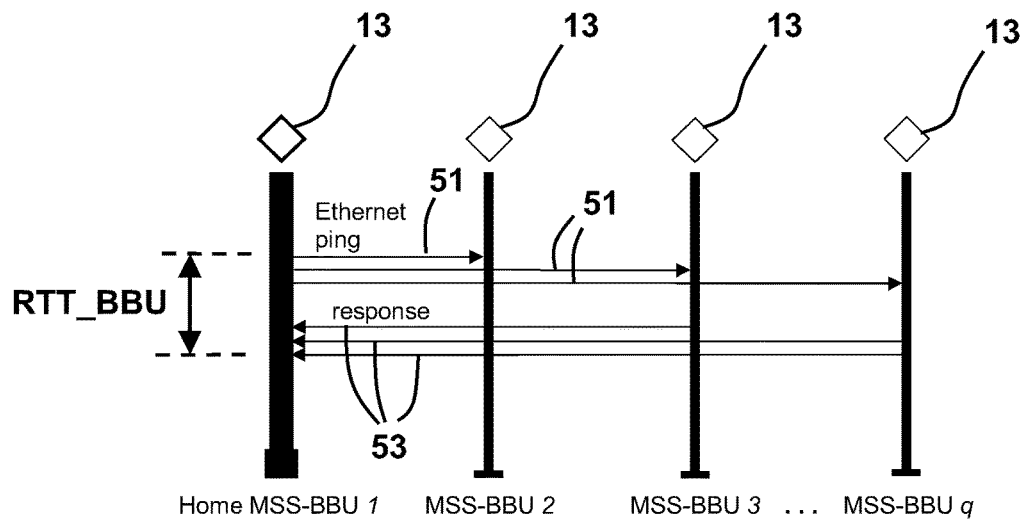
FIG. 4 shows a message sequence chart of test message for determining a delay between a baseband processing device and further baseband processing devices of the network shown in FIG. 1.

As shown in FIG. 4, this roundtrip time RRT_BBU may be measured by sending a second test message 51 to the baseband processing devices 13 discovered in step 47 and receiving a second response message 53 transmitted by the baseband processing devices 13 in response to the second test message. In an embodiment, the second test message 51 and the second response message 53 may be a loopback test message ("Ethernet Ping") according to Ethernet protocols used on the interconnection links 25. This loopback test message can be used to measure the roundtrip delay RTT_BBU similar to the Internet Control Message Protocol (ICMP) echo request message and ICMP echo response message on the IP layer. As illustrated in FIG. 4, the roundtrip time RRT_BBU may be determined by subtracting a transmission time of the second test message 51 from a reception time of the respective second response message. In another embodiment, the first and/or second test message 41, 51 and the first and/or second response message 43, 53 may be an ICMP echo request and an ICMP echo response, respectively.

A Step 55 is executed after step 49. Step 55 compiles an initial neighbour list NL_INIT of baseband processing devices 13 that can potentially be used as remote baseband processing devices 13 for remote baseband processing. To this end, step 55 includes only those baseband processing device 13 in the initial list NL_INIT a one way transmission delay of which is less than the first delay threshold TH1, i.e. only those baseband processing devices 13 are included in the initial neighbour list NL_INIT for which the condition $$delay = \frac{RTT\_BBU}{2} < TH1 \quad (4)$$

holds.

The initial neighbour list NL_INIT is a result of the initialisation phase 35. Accordingly, in the shown embodiment, step 55 is the last step of the initialisation phase 35. Consequently, the method 33 enters an operational phase 57 after having completed the initialisation phase 35, in particular step 55 of the initialisation phase 35.

A step 59 of the operational phase 57 is executed after step 55. Step 59 waits until the event e occurs that triggers an allocation or reallocation of baseband processing resources to a certain communication process such as a radio bearer RB. Such an event e may occur when a new radio bearer RB is set up, when a radio bearer RB is modified or deactivated or when the handover of the terminal 29 to a different serving remote radio head 15 is executed.

After the event e has occurred, a step 61 of the operation phase 57 measures the delay metric, e.g. the roundtrip time RRT_BBU between the home baseband processing device 13 and the potential remote baseband processing devices 13 included in the list NL_INIT, again. Repeating the measurement of the roundtrip time RRT_BBU in the operational phase 57 increases the reliability and the accuracy of the method 33 because up-to-date values of this roundtrip time RRT_BBU are determined that correspond to the momentarily load situation and/or buffer occupancy in the interconnecting network, in particular on the interconnection links 25.

Step 61 is succeeded by a step 63 of the operational phase 57 that determines a second delay threshold TH2 according to the above equation (2), i.e.

$$TH2 = TransportDelay_{nax} - RTT\_RRH, \quad (5)$$

where RTT_RRH stands for the round trip time (e.g. measured in step 39) between the home baseband processing device 13 and the serving radio head 15 involved in the communication process (e.g. radio bearer) for which a remote baseband processing device 13 shall be selected.

After the completion of step 63, a step 65 is executed that verifies for each potential baseband processing device 13 in the initial neighbour list NL_INIT whether the measured roundtrip time RRT_BBU is less than the second delay threshold TH2. If so, then the respective baseband processing device 13 is included in a neighbour list NL. Otherwise, the respective baseband processing device 13 is not included in the neighbour list NL. Thus, the result of step 63 is the neighbour list NL including all baseband processing devices 13 that can be used for remote baseband processing as regards the above discussed real-time constraints.

In an embodiment, a step 67 may be provided that selects one baseband processing device N among the baseband processing devices 13 present in the neighbour list NL for remote baseband processing. For the selection in step 67, further selection criteria that may not be related with the real-time constraints discussed herein may be applied. For example, a load situation in the baseband processing devices 13 present in the neighbour list NL may be considered. For instance, a baseband processing device N may be selected in step 67 that has sufficient processing resources available for the intended remote baseband processing. After the completion of step 67, the method 33 returns to step 59.

The event e that triggers the recalculation of the neighbour list NL in steps 61, 63 and 65 may be any event that may occur in a mobile communication system, in particular in the access network 11 of the mobile telecommunication system that typically triggers allocation or reallocation of baseband processing resources. The event e may be for example a request for establishment, modification or removal of a radio bearer. Furthermore, the event e may be related to handovers between different cells 27 of the access network 11.

For instance, the event e may be a handover of the terminal 29 between different cells 27 connected to the same baseband processing device 13. In particular the event e may be the occurrence of a handover command related to such a handover. This type of handover leads to a change of the remote radio head 15 but the home baseband processing device 13 remains the same. Because the remote radio head 15 has changed, typically a different value of the roundtrip time RTT_RRH between the home baseband processing device 13 and the serving remote radio head 15 must be considered. Usually the handover leads to a modification of the second delay threshold TH2, which in turn may have the effect that the operational phase 57 of the method 33 may modify the neighbour list NL, where the actual remote baseband processing device 13 disappears from the neighbour list, i.e. a radio bearer RB needs to be processed either by another remote baseband processing device 13 or even by the home baseband processing device 13.

Figure 5:
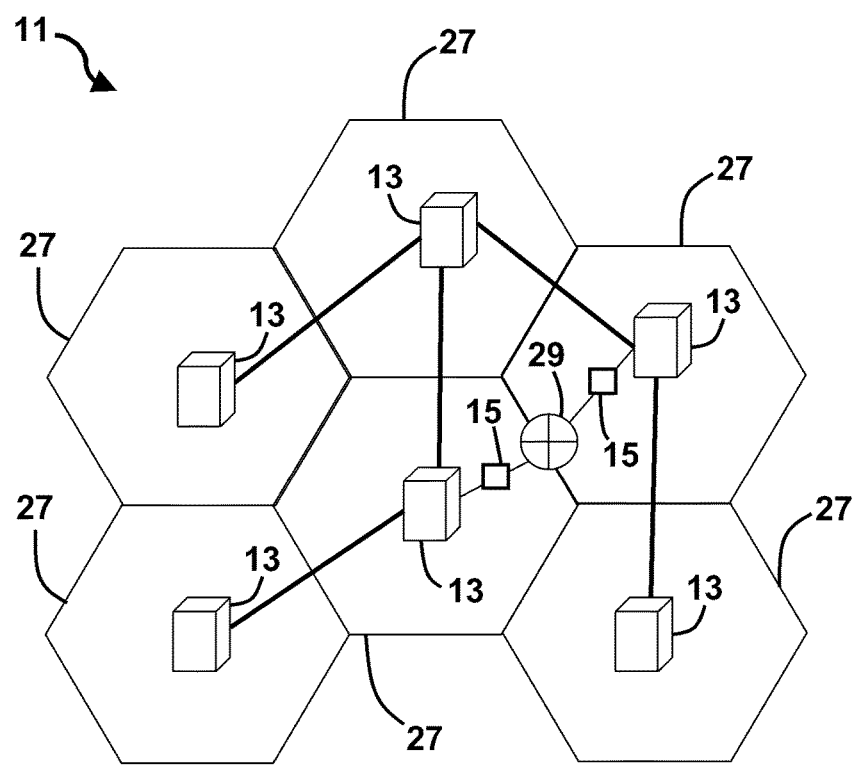
FIG. 5 shows a handover scenario, where a handover triggers a reallocation of baseband processing resources.

A slightly different situation arises in cases where a handover between cells 27 connected to different baseband processing device 13 occurs. Such a handover results in a change of the home baseband processing device 13. An exemplary scenario of such a handover is shown in FIG. 5. Because the home baseband processing device 13 has changed due to this type of handover, step 61 calculates the roundtrip time values RTT_BBU for the new home baseband processing device 13. The second delay threshold TH2 and the neighbour list NL are recalculated accordingly. Step 67 may select one neighbour N in the recalculated neighbour list NL as a baseband processing device 13 for remote baseband processing.

To sum up, the method 33 and the network elements, e.g. at least one baseband processing device 13, described herein allow constructing a cluster of multiple baseband processing devices 13 for distributed baseband processing. A neighbourhood relation NL is determined by the sum of the delays that meet the delay constrains available for the transport after the subtraction of the processing times in the terminal 29 and the components 13, 15 of the distributed base station and the air interface propagation delay from the HARQ timing requirements, e.g. in 3GPP LTE and High Speed Packet Access (HSPA). The sum of delays consists of the entire cumulative delay from the home baseband processing device 13 to the serving remote radio head 15 and from the home baseband processing device 13 to the remote baseband processing device 13. Due to changing network conditions (e.g. packet buffer occupancy), the neighbour list NL is prone to dynamical variations. The operational phase 57 of the method 33 allows to adapt the neighbour list NL to these dynamic variations and reselecting the remote baseband processing devices 13 if applicable.

The invention claimed is:

1. A method for operating a wireless communication network or a network element thereof, the network comprising a plurality of baseband processing devices, the method comprising:
   determining a delay metric that depends on a network delay between the network element and at least one baseband processing device of the plurality of baseband processing devices, wherein the delay metric is determined before an event occurs that triggers allocation or reallocation of processing resources of the at least one baseband processing device,
   selecting the at least one baseband processing device of the plurality of baseband processing devices for remote baseband processing depending on the delay metric, and
   communicating with the selected at least one baseband processing device such that the selected at least one baseband processing device performs remote baseband processing.

2. Method according to claim 1, wherein the delay metric depends on a round trip time between the network element and the at least one baseband processing device of the plurality of baseband processing devices.

3. Method according to claim 1, wherein said selecting includes comparing the delay metric determined before the occurrence of the event with a first delay threshold and selecting at least one baseband processing device as a candidate baseband processing device depending on said comparing.

4. Method according to claim 3, wherein the method comprises generating a candidate list that includes the baseband processing devices selected as candidate baseband processing devices.

5. Method according to claim 1, wherein the delay metric is determined upon the occurrence of the event that triggers allocation or reallocation of baseband processing resources, the delay metric being determined for at least one candidate baseband processing device.

6. Method according to claim 5, wherein said selecting includes comparing the delay metric determined upon occurrence of the event with a second delay threshold and selecting a candidate baseband processing device as a neighbour baseband processing device for remote processing depending on said comparing.

7. Method according to claim 6, wherein the method comprises generating a neighbour list that includes the at least one baseband processing device selected as a neighbour baseband processing device.

8. Method according to claim 1, wherein the method comprises determining a further delay metric that depends on a network delay between the network element and at least one remote radio head and determining at least one of a first delay threshold and a second delay threshold depending on the further delay metric.

9. Wireless communication network comprising a network element and a plurality of baseband processing devices, wherein the network and/or a network element of the network is operable for executing a method according to claim 1.

10. The method of claim 1, wherein the delay metric is determined before any event occurs that triggers allocation or reallocation of processing resources of the at least one baseband processing device.

11. The method of claim 1, wherein the delay metric is determined during an initialization phase of the network element.

12. The method of claim 1, wherein the selected at least one baseband processing device is different and remote from a home baseband processing device included in the plurality of baseband processing device, said home baseband processing device being allocated to a radio head serving a mobile terminal involved in the event.

13. The method of claim 12, wherein the event is one of: establishment of a radio bearer, modification of a radio bearer, removal of a radio bearer or a handover of the mobile terminal from one radio head to another radio head.

14. A network element for a wireless communication network comprising a plurality of baseband processing devices, the network element being operable for
- determining a delay metric that depends on a network delay between the network element and at least one baseband processing device of the plurality of baseband processing devices, wherein the delay metric is determined before an event occurs that triggers allocation or reallocation of processing resources of the at least one baseband processing device,
- selecting the at least one baseband processing device of the plurality of baseband processing devices for remote baseband processing depending on the delay metric, and
- communicating with the selected at least one baseband processing device such that the selected at least one baseband processing device performs remote baseband processing.

15. Network element according to claim 14, wherein the network element is a baseband processing device for a wireless communication network arranged for transmitting a baseband signal to a remote radio head and/or for receiving a baseband signal from the remote radio head.

16. A non-transitory computer readable storage medium, including a computer program for operating a network element of a wireless communication network comprising a plurality of baseband processing devices, such that when the computer program is executed on a processor of said network element, the following step are carried out:
- determining a delay metric that depends on a network delay between the network element and at least one baseband processing device of the plurality of baseband processing devices, wherein the delay metric is determined before an event occurs that triggers allocation or reallocation of processing resources of the at least one baseband processing device,
- selecting the at least one baseband processing device of the plurality of baseband processing devices for remote baseband processing depending on the delay metric, and
- communicating with the selected at least one baseband processing device such that the selected at least one baseband processing device performs remote baseband processing.

* * * * *